Figures 1, 2:
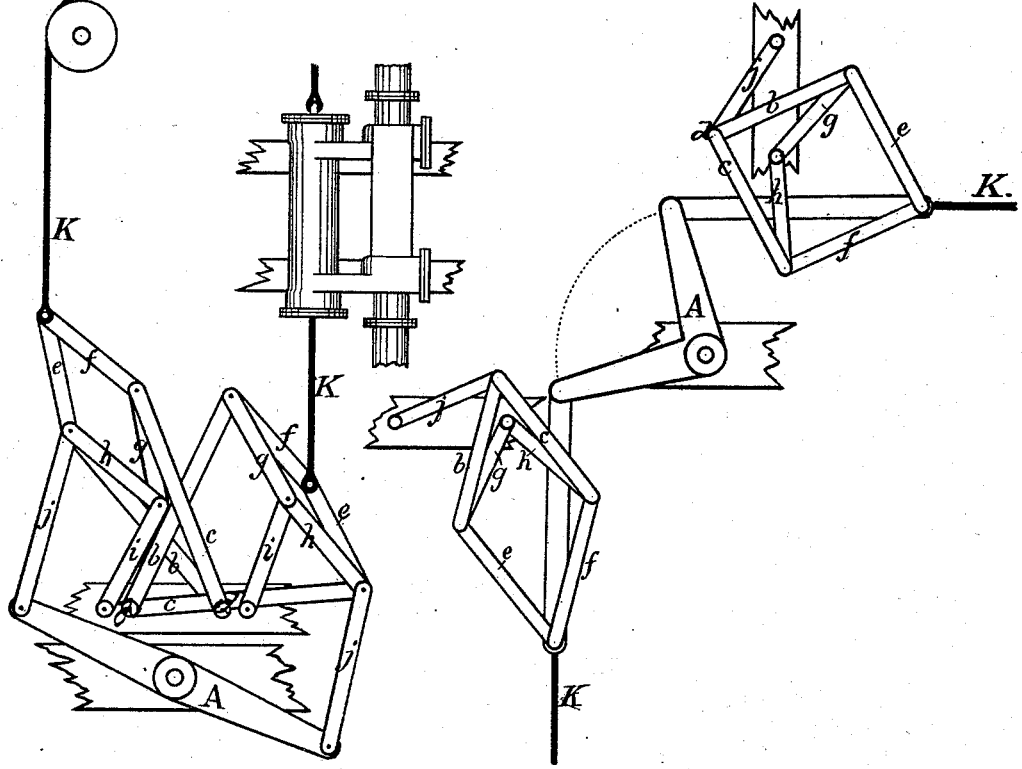

F. A. BISHOP.
Mechanical Movement.

No. 222,769. Patented Dec. 23, 1879.

Witnesses:
W. Floyd Duckett
Thos W. Brown

Inventor;
Francis A. Bishop

UNITED STATES PATENT OFFICE.

FRANCIS A. BISHOP, OF SAN FRANCISCO, CALIFORNIA.

IMPROVEMENT IN MECHANICAL MOVEMENTS.

Specification forming part of Letters Patent No. 222,769, dated December 23, 1879; application filed April 21, 1879.

*To all whom it may concern:*

Be it known that I, FRANCIS A. BISHOP, of the city and county of San Francisco, State of California, have invented an Improved Mechanical Movement; and I do hereby declare that the following is a full, clear, and exact description thereof, reference being had to the accompanying drawings.

My invention has reference to a system of pivoted links for converting the curved reciprocating motion of the outer end of a pivoted lever into a rectilinear motion.

By employing a double set of links and connecting one set with each end of a walking-beam I am able to transmit the curved reciprocating motion of the two outer extremities of the beam in parallel lines. The chief object of this latter arrangement is to enable me to operate two pump rods or wires in straight and parallel lines without deflecting the rods or wires by the curved motion of the extremities of the beam.

The arrangement of the links is such that they form toggles, by which I secure a greater leverage with perfect uniformity of motion.

Referring to the accompanying drawings, Figure 1 is a plan view of my improved mechanical movement. Fig. 2 shows the way of transmitting around a corner by means of a bell-crank.

Let A represent an ordinary walking-beam, which is pivoted at its middle, as shown. The outer extremities of this beam will describe a curved line about the center of motion or pivot when a reciprocating motion is imparted to it. To convert this circular or curved motion into a rectilinear motion is one of the objects of my system of linkage. To do this I take two links or levers, *b c*, and secure one end of each upon the same pivot or center *d*, at a suitable point near the walking-beam, while their opposite ends I connect by means of two toggle-links, *e f*, which break outward. To the middle or connecting joint of these toggle-links I attach the end of the rod or wire K, to which the rectilinear motion is to be imparted. I also connect the ends of these links or levers *b c* by two other similar toggle levers or links, *g h*, which break inward, or in a direction opposite to the movement of the toggles *e f*. To the middle or connecting joint of these inward-breaking toggles I attach one end of a short link, *i*, the opposite end of which is pivoted at equal distances from the two ends of the lever or link *c*. This forms a triangular system of links, the upper side of which is composed of two pairs of toggles, one pair breaking outward, while the other breaks inward, the latter being controlled by the link *i*. The lower outside corner of this triangular series of links I then connect with the extremity of the walking-beam or pivoted lever by a link, *j*.

Now, when the end of the beam or lever moves upward the outer end of the lower link, *c*, is moved upward by the connecting-link *j*. As it moves up the short link *i* draws the connected ends of the toggles *g h* inward, compelling the connected ends of the other or outer pair of toggles, *e f*, to which the rod K is attached, to move outward in a direct or right line. The downward motion of the end of the lever or beam draws the two pairs of toggle-links together in a reverse manner.

As above stated, by connecting one system of levers in the manner above described with each end of a walking-beam I can operate two pump-rods, cables, ropes, beams, or other reciprocating mechanism in rectilinear and parallel lines.

This walking-beam system of linkage can be placed either above or below the pump, according to the conditions under which it is employed.

Power transmitted through this system of links is better applied, and an increased leverage is obtained, as the toggle action of the links greatly increases the efficiency of the power.

By using a triangular system of jointed links, like that above described, as a hanger for suspending and supporting a horizontally-reciprocating rod, cable, rope, or beam, I can avoid the use of supporting-pulleys and the friction resulting therefrom. This adaptation of the linkage system is represented in Fig. 1, where the points of attachment are made above the suspended weight, as shown.

This arrangement is very useful for suspending and supporting pump-rods or cables in mines where the cable or pump-rod passes through a tunnel, drift, or incline.

For operating a pump or system of pumps in a mine where the pump-rods or cables which transmit the power to the pump or pumps pass down a shaft and are deflected so as to pass along the levels or through tunnels and inclines, I apply a walking-beam system at the upper end of the shaft and another at the opposite or lower end, down in the mine. At suitable points where the rods or cables pass through the tunnels or inclines I suspend them by means of my link-hangers, so that they encounter no friction, but swing easily back and forth. By using a bell-crank, as represented in Fig. 2, and connecting a system of links with each extremity, while the angle operates on a pivot, I can carry the cables around a corner or short bend, thus entirely doing away with pulleys and other frictional devices.

I do not confine myself to any particular number of links in a system, as a greater or less number can be used, especially for hanging or suspending a rope or cable. The upper system in Fig. 1 represents an arrangement in which only five links are used.

Having thus described my invention, what I claim, and desire to secure by Letters Patent, is—

The mechanical movement for converting motion, consisting of the combination, with the walking-beam A and the piston-rod or wire connection K, of the two sets of toggle-levers $e\,f$ and $g\,h$, connected together and breaking in opposite directions, levers $b\,c$, having a common pivotal point and connected to opposite extreme ends of the levers $e\,f\,g\,h$, link $i$, connected to the point of union between the levers $g\,h$ and to a fixed point equidistant from the ends of the lever $c$, and link $j$, connecting the levers $e\,f\,g\,h$ to the walking-beam A, substantially as and for the purpose set forth.

In witness whereof I have hereunto set my hand and seal.

FRANCIS A. BISHOP. [L. S.]

Witnesses:
 JOHN R. JONES,
 THOMAS PRICE.